United States Patent [19]

Yun

[11] Patent Number: 5,142,378
[45] Date of Patent: Aug. 25, 1992

[54] LOW BAND CONVERTER FOR USE IN A VIDEO TAPE RECORDER

[75] Inventor: Jong-Kyoung Yun, Suwon, Rep. of Korea

[73] Assignee: SamSung Electronics Co., Ltd., Suwon, Rep. of Korea

[21] Appl. No.: 370,713

[22] Filed: Jun. 23, 1989

[51] Int. Cl.⁵ .............................................. H04N 9/79
[52] U.S. Cl. .................................... 358/330; 358/317
[58] Field of Search ................. 358/310, 320, 330, 11, 358/326, 325, 324, 311, 19, 315, 316, 317

[56] References Cited

U.S. PATENT DOCUMENTS

| | | | |
|---|---|---|---|
| 2,904,628 | 1/1956 | Haantjes et al. | 358/19 |
| 4,136,358 | 1/1979 | Clemens et al. | 358/11 |
| 4,200,881 | 4/1980 | Carnt et al. | 358/19 |

Primary Examiner—Roy N. Envall, Jr.
Assistant Examiner—Thai Tran
Attorney, Agent, or Firm—Robert E. Bushnell

[57] ABSTRACT

A low band converter for recording color signals converted in low band onto a video tape media of a VTR system. The inventive converter for use in a video tape recorder is capable of converting color signals thereof in low band, so that phase and frequency of the color signals may be correctly coincident with those of a horizontal synchronization signal in the VTR, by first demodulating and next modulating by way of synthesizing the color-differential signals from the color signals. An apparatus for achieving the converter includes a burst gate generator BGPG, a pulse synthesizer, a first delay circuit, a second delay circuit, a burst amplifier, a color signal demodulator, a first modulator, a second modulator, a mixer, a first detector and a second detector, a color gain converter ACC, a video recording amplifier, a color killer suited, and a low pass filter 100.

8 Claims, 2 Drawing Sheets

LOW BAND CONVERTER FOR USE IN A VIDEO TAPE RECORDER

BACKGROUND OF THE INVENTION

The present invention relates to a video tape recorder (VTR) system, and in particular to a low band converter for recording color signals converted in low band onto a video tape media of a VTR system.

In general, color signals for use in a VTR are converted in low band, so as to avoid the occurrence of beat phenomena resulting from interference between the color signals and other frequency modulation (FM) signals, and further to prevent jitter noises from affecting the color signals owing to the limitation of high-frequency characteristic by relative velocity and width of a video tape used in a particular type of VTR (i.e. 0.5-inch VTR). Therefore, a known VTR system for converting the color signals in low band is shown in FIG. 1.

Referring to the known system, an automatic color gain controller 80 (hereinafter, referred to as "ACC") receiving a color signal from narrow band filter (not shown), amplifies the color signal when its level is lower than a reference level, thereafter outputing into a burst amplifier 11 and a burst gate detector 12 (hereinafter, referred to as "BGD"). Then, the burst amplifier 11 amplifies with about 60 decibels (dB) only a burst signal of the output of ACC 80, thereafter outputing into a main balance modulator 18 (hereinafter, referred to as "MBM"). BGD 12 selects only the burst signal of the output of ACC 80 by burst window pulses (hereinafter, referred to as "BWP") provided from a burst gate pulse generator BGPG 10, thereafter outputing into killer phase comparators KPC 13, 14.

The ACC detector 81 detects direct-current (DC) level of BGD burst signal, to control a reference level of the ACC 80, and the KPC 14 compares the BGD burst signal with phase of an oscillation frequency signal of a first voltage-controlled-oscillator VCO 15, to control the oscillation frequency of the VCO 15 at a fixed frequency of 3.58 MHz. A circuit portion comprising a digital phase-locked-loop DPLL 21, a ring counter 22, a phase-rotation circuit HR 23, a ½-counter 24, a ½-counter 25, a 1/320-counter 26, a second voltage-controlled-oscillator VOC 27, and a record automatic frequency control phase comparator 28 (hereinafter, referred to as "AFC"), generates a 629 KHz pulse signal supplied from a synchronization separator (not shown), to output into a sub-balanced modulator 16 (hereinafter, referred to as "SBM") through the phase-rotation circuit 23.

Thereafter, the SBM 16 receives the 3.58 MHz pulse signal of the first VCO 15 and the 629 KHz pulse signal of the phase-rotation circuit 23, and by balance modulation thereof supplies a fixed frequency of pulse signal corresponding to a sum and a difference of the two inputs, to the MBM 18 through a high-pass filter 101. The MBM 18 receiving a 4.2 MHz pulse signal from the filter 101, also receives the amplified color signal from the burst amplifier 11 to carry out a balance modulation therefrom, and to convert in low band the received color signal into a color signal that coincides with the horizontal synchronization signal in phase and frequency, thereafter outputing into a color killer switching circuit 110 through a video recording amplifier 90. The KPC 13 receives the 3.58 MHz pulse signal of the first VCO 15 delayed in phase by 90 degrees, through a phase delaying circuit 17, and the output of BGD 12, and by comparing phases thereof, generates a color control signal into the color killer switching circuit 110. The color control signal switches on and/or off the color killer switching circuit 110 transmitting the color signal amplified in the amplifier 90, into the low pass filter 100 that outputs to a pre-amplifier (not shown) only color signals covering 629±500 KHz of low-frequency bands from the received color signals thereof.

However, the above described known circuit for converting in low bands the input color signal so as to make coincidence a horizontal synchronization signal with a VTR system in both phase and frequency thereof, generally performs a two-stage modulation with the SBM 16 and the MBM 18. Hence, there often arises a case that the phase of color signals converted in low band does not coincide with that of the horizontal synchronization signal in the VTR system. In addition, this frequency results in phase mismatching in the video system.

SUMMARY OF THE INVENTION

Accordingly, the object of the invention is to provide a low band converter for use in a video tape recorder capable of converting color signals thereof in low band, so that phase and frequency of the color signals may be correctly coincident with those of horizontal synchronization signal in the VTR, by first demodulating and next modulating by way of synthesizing the color-differential signals from the color signals.

According to an aspect of the present invention, the low band converting circuit for use in a recording system of a VTR includes a burst gate genertator for generating a burst window pulse, a pulse sysnthesizer for generating a train of pulses, a first delay circuit for delaying the pulse train output of the pulse synthesizer, a second circuit for delaying the pulse train output of the pulse synthesizer, a burst amplifier for generating a burst signal modulated in low band, a color signal demodulator for demodulating Red-Luminance (R-Y) signal and Blue-Luminance (B-Y) signal, a first modulator for modulating said Blue-Luminance signal, a second modulator for modulating the Red-Luminance signal in low band, a mixer for mixing said tow Luminance signals, a first detector and second detector for detecting the Luminance signals, a color gain convertor for controlling the color signal, a video recording amlifier for amplifying the color signal, a color killer switching means for transmitting the color signal into the low pass filter, and a low pass filter for filtering the color signal.

BRIEF DESCRIPTION OF THE DRAWINGS

For a better understanding of the invention and to show how the same may be carried into effect, reference will now be made, by way of example, to the accompanying diagrammatic drawings, in which.

DETAILED DESCRIPTION OF THE INVENTION

Hereinafter, a preferred embodiment of the present invention will be described in detail with reference to the attached drawings.

Figure 2:
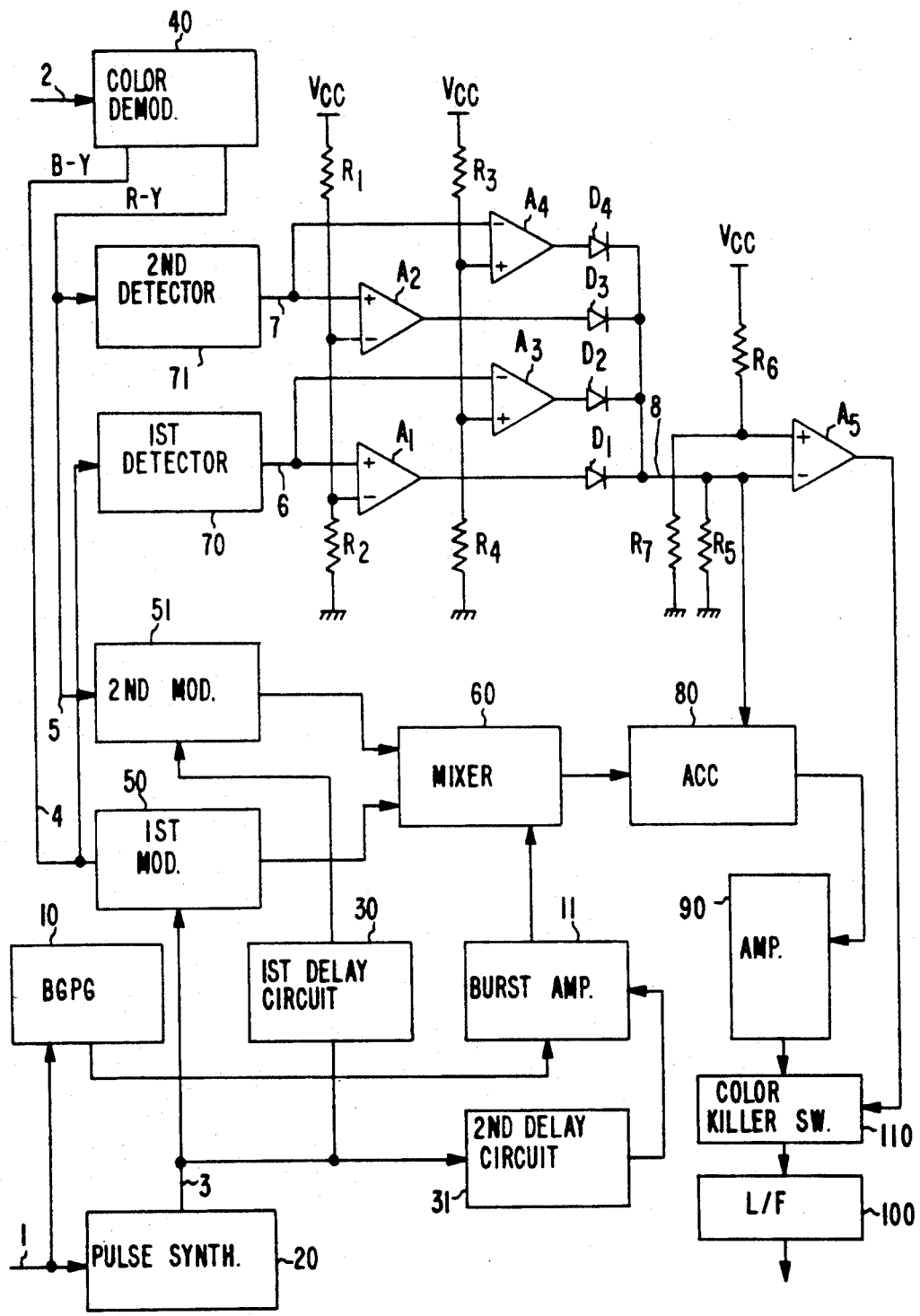
FIG. 2 is a block diagram illustrating a preferred embodiment of the low band converter according to the invention.

Referring to FIG. 2, a block diagram specifically illustrating a preferred embodiment fo the low band converter is shown with respect to the numeral references. The low band converting circuit for use in a recording system of a VTR comprises a burst gate genertator BGPG 10, a pulse sysnthesizer 20, a first delay circuit 30, a second delay circuit 31, a burst amplifier 11, a color signal demodulator 40, a first modulator 50, a second modulator for 51, a mixer 60, a first detector and a second detector 70 and 71, a color gain convertor ACC 80, a video recording amlifier 90, a color killer switching means 110, and a low pass filter 100.

According to the preferred embodiment, the burst gate pulse generator BGPG 10 generates a burst window pulse by receiving a horizontal synchronizing signal. The pulse synthesizer 20 generates a train of pulses having a given frequency by receiving said horizontal synchronizing signal. The first delay circuit 30 delays the pulse train output of the pulse synthesizer by a first given phase angular. The second delay circuit 31 delays the pulse train output of the pulse synthesizer by a second given phase angular. The burst amplifier 11 generates a burst signal converted into low band, by amplifying the delayed pulse train of the second delay circuit up to the second given phase angular during a time period according to the burst window pulse supplied from the burst gate pulse generator, so that said delayed pulse train becomes a fourth given level.

In addition, the color signal demodulator 40 demodulates Red-Luminance signal and Blue-Luminance signal from color signals received. The first modulator 50 receives said Blue-Luminance signal of the color signal demodulator and the pulse train of the pulse synthesizer so as to modulate said Blue-Luminance signal in low band according to said pulse train. The second modulator 51 receives said Red-Luminance signal of the color signal demodulator and the delayed pulse train of the first delay circuit by the second given phase angular so as to modulate said Red-Luminance signal in low band by the second given phase angular. The mixer 60 generates a low-band-modulated color signal by mixing the Blue-Luminance signal and the Red-Luminance signal modulated in low band in the first and second modulators, with the burst signal modulated in low band of the burst amplifier. The first detector 70 detectes the Blue-Luminance signal of the color-signal demodulator. The second detector 71 detectes the Red-Luminance signal of the color-signal demodulator.

Furthermore, the color-gain controller ACC 80 controls automatically the color signal output from the mixer 60, with a given output level in response to a gain control signal. The video recording amplifier 90 amplifies with a fixed gain color signal output supplied from the color-gain controller 80. The low pass filter 100 filters and thereby outputs only color signals within said given frequency band of the color signal output of said video recording amplifier. The color killer switching means 110 transmites the color signal amplified in said video recording amplifier into said low pass filter.

The means for providing the gain control signal, comprises a plurality of operational amplifiers A1 to A4 (hereinafter, will be referred to as "OP-AMPs"). The first OP-AMP A1 receives the output of the first detector 70 with its positive input, and a first reference voltage provided by a voltage divider comprising resistors R1, R2 coupled in series with its negative input, and delivers its output through a diode D1. The second OP-AMP A2 receives with its positive input the output of the second detector and with its negative input said first reference voltage, and delivers its output to a diode D3. The third OP-AMP A3 receives the output of the first detector 70 with its negative input, and a second reference voltage provided by another voltage divider comprising resistors R3, R4 coupled in series between a supply voltage Vcc and a ground potential, into its positive input, and delivers its output through a diode D2.

Figure 1:
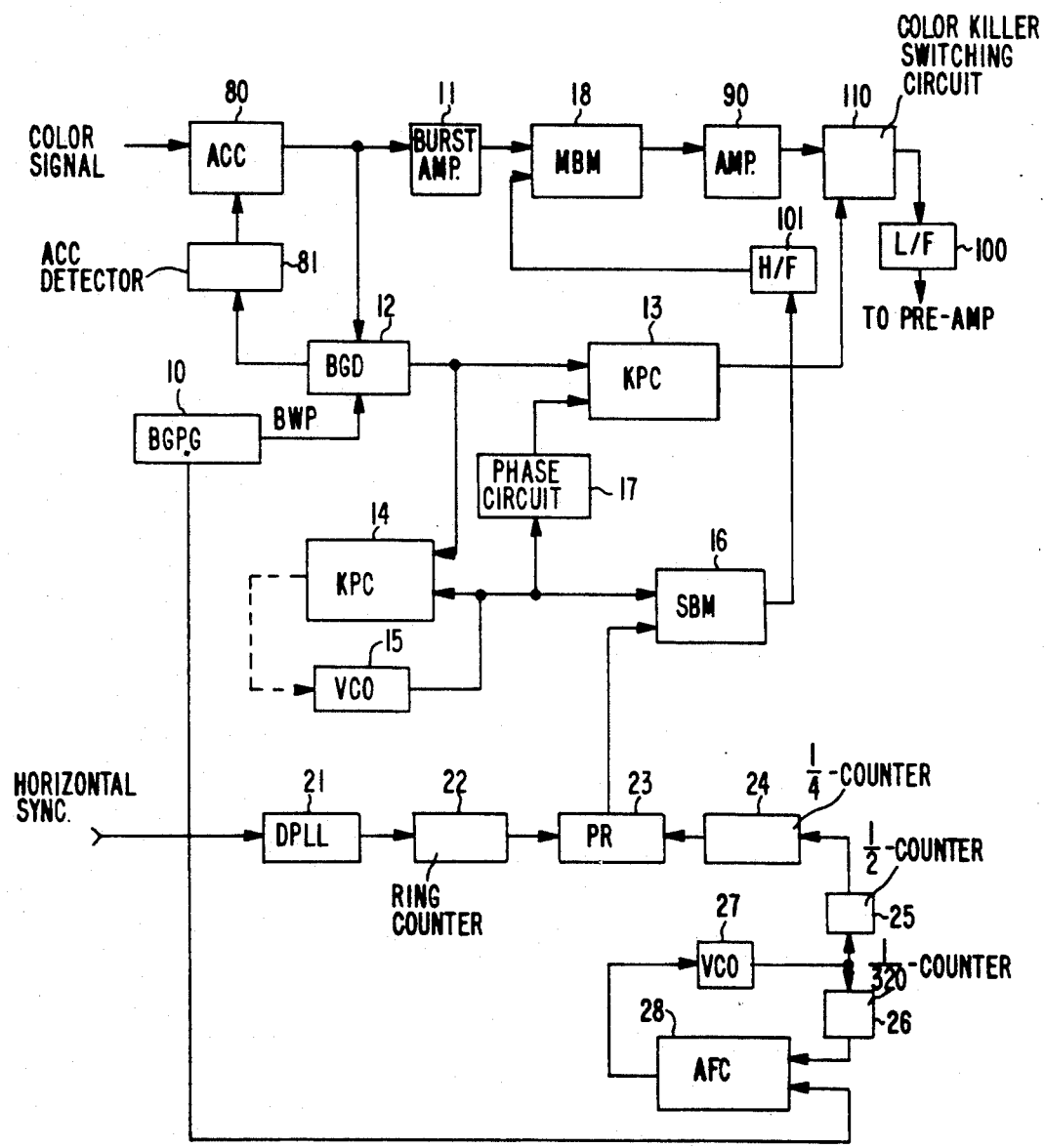
FIG. 1 is a block diagram according to a known low-band converter in a known video tape recorder system.

In addition, the fourth OP-AMP A4 receives the output of the second detector 71 with its negative input, and said second reference voltage with its positive input, and delivers its output through a diode D4. All outputs of the diodes D1 to D4 are coupled to a line 8. Said means for providing the switching control signal, comprises a fifth OP-AMP A5 of which negative input is coupled to the line 8 and positive input is coupled to a third reference voltage provided by resistors R6, R7 coupled between the supply voltage Vcc and the ground, and of which output is coupled to the color killer switching circuit 110, thereby providing the switching control signal to control its switching operation. The pulse synthesizer 20 comprises digital phase-locked-loop 21, ring counter 22, phase-rotation circuit 23, ¼-counter 24, ½-counter 25, 1/320-counter 26, second voltage-controlled-oscillator 27 and the AFC 28, which has the same construction as that shown in FIG. 1. The color demodulator 40 is a known color demodulation circuit in general use in the conventional television set.

Assuming now that a horizontal synchronization signal is received through the input line 1 and a video signal is received through the input line 2, the pulse synthesizer 20 outputs therefrom a first frequency on its output line 3, said first frequency preferably being a pulse train of 629 KHz frequency a low band conversion frequency in the art of conventional video tape recording systems. The BGPG 10 also receives the horizontal synchronization signal, which is delayed by a given amount of time, thereby generating a burst window pulse to the burst amplifier 11. The first delay circuit 30 receives the pulse train of said line 3, which is delayed therein by a first phase angular (preferably, it will be 90° hereinafter) and then delivered into the second modulator 51. The second delay circuit 31 also receives the pulse train of said line 3, which is delayed therein by a second phase angular (preferably, it will be 180° hereinafter) and then delivered into the burst amplifier 11. This burst amplifier 11 amplifies with about 60 dB the pulse train delayed by 180° in phase during a pulse duration of said burst window pulse of the BGPG 10, thereby making a burst signal supplied to the mixer 60.

Thereafter, the color demodulator 40 receiving the video signal through the input line 2, detects out therefrom the R-Y signal and the B-Y signal, respectively, thereby supplying the B-Y signal into the first modulator through a line 4, and the R-Y signal into the second modulator through a line 5. The first modulator 50 modulates the B-Y signal on the line 4 with the pulse train of the line 3, and then delivers to the mixer 60 the B-Y signal modulated in low band, said B-Y signal being carried on said pulse train. Also, the second modulator 51 modulates the R-Y signal on the line 5 with the phase-delayed pulse train supplied from the first delay circuit, and then delivers to the mixer 60 the R-Y signal modulated in low band, said R-Y signal being carried on said pulse train delayed by 90° in phase. The mixer 60 therefore receives the B-Y signal modulated in low band of the first modulator 50, the R-Y signal modulated in low band of the second modulator 51, and said burst signal of the burst amplifier 11, therefrom outputing their mixed color signal to the ACC 80.

The first detector 70 detects the B-Y signal on the line 4 and delivers its output to a line 6, and the second detector 71 detects the R-Y signal on the line 5 and delivers its output to a line 7. The first OP-AMP A1 receiving said B-Y signal with its positive input, generates a logic high output only when said B-Y signal level is higher than the first reference voltage supplied between the resistors R1, R2. Whereas, the third OP-AMP A3 receiving said B-Y signal into its negative input generates a logic high output only when said B-Y signal level is lower than the second reference voltage supplied between the voltage dividing resistors R3 and R4.

Likewise, the OP-AMP A2 receiving the R-Y signal into its positive input, generates a logic high output only when said R-Y signal level is higher than the first reference voltage, whereas the OP-AMP A4 receiving the R-Y signal into its negative input, generates a logic high output only when said R-Y signal level is lower than the second reference voltage. All the outputs of said OP-AMPs A1-A4 are connected through diodes D1-D4 to the line 8, respectively, which control the color gain of the ACC 80 delivering the mixed color signal of the mixer 60 into the video recording amplifier 90. A resistor R5 coupled between the line 8 and the ground is used as an output resistance of said OP-AMPs. In addition, the fifth OP-AMP A5 receiving the output on said line 8 with its negative input, generates the switching control signal to control the switching operation of the color killer switching means 110, only when its negative input signal is lower than the third reference voltage supplied between the voltage dividing resistors R6, R7. In response to said switching control signal, the color killer switching means delivers or mutes the color signal output converted in low band of the video recording amplifier 90 to the low pass filter 100.

Therefore, the color-gain in the ACC 80 is controlled according to the output on said line 8 of said means for providing the gain control signal, and the controlled color signal output of the ACC is amplified by a given rate in the video recording amplifier 90 of which output is delivered into the low pass filter 100 further to a preamplifier (not shown). The low pass filter 100 filters the color signal to deliver only color signals having about 699 KHz to the preamplifier in other portion of the VTR system.

Accordingly, as apparent from the aforementioned description, the inventive low band converting circuit will have an advantage that can correctly match the color signal with the phase and frequency of the horizontal hsynchronizing signal of the VTR system, thereby to convert the color signal into low band.

While the invention has been particularly shown and described with reference to a preferred embodiment, it will be understood by those skilled in the art that modifications in detail may be made without departing from the spirit and scope of the invention.

What is claimed is:
1. A low band converting circuit for use in a color signal recording system of a video tape recorder, comprising:
   a burst gate pulse generator for generating a burst window pulse in response to a horizontal synchronizing signal;
   a pulse synthesizer for generating a pulse train output having a given frequency in response to said horizontal synchronizing signal;
   a first delay circuit for delaying the pulse train output of the pulse synthesizer by a first period;
   a second delay circuit for delaying the pulse train output of the pulse synthesizer by a second period;
   a burst amplifier for generating a burst signal converted into low band, by amplifying the delayed pulse train of the second delay circuit during a time period according to the burst window pulse supplied from the burst gate pulse generator, so that said delayed pulse train attains a given level;
   a color signal demodulator for demodulating a Red-Luminance signal and a Blue-Luminance signal from color signal received;
   a first modulator for receiving said Blue-Luminance signal from the color signal demodulator and the pulse train of the pulse synthesizer to modulate said Blue-Luminance signal in low band according to said pulse train output;
   a second modulator for receiving said Red-Luminance signal of the color signal demodulator and the delayed pulse train of the first delay circuit, for modulating said Red-Luminance signal in low band with the delayed pulse train of the first delay circuit;
   a mixer for generating a low-band-modulated color signal by mixing the Blue-Luminance signal and the Red-Luminance signal modulated in low band respectfully from the first and second modulators, with the burst signal converted into low band of the burst amplifier;
   a first detector for detecting the Blue-Luminance signal from the color-signal demodulator;
   a second detector for detecting the Red-Luminance signal from the color-signal demodulator;
   a color-gain controller for controlling automatically the color signal output from the mixer, to provide a given output level in response to a gain control signal;
   a video recording amplifier for amplifying with a fixed gain color signal, output supplied from the color-gain controller;
   a low pass filter for filtering color signals from said video recording amplifier;
   color killer switching means for switching between ON and OFF states the color signal output of the video recording amplifier in response to a switching control signal;
   means for providing the gain control signal to control the operation of said color-gain controller, on the basis of the detection of said Blue-Luminance and Red-Luminance signals by said first and second detectors; and
   means for providing the switching control signal to control the switching operation of said color killer switching means, according to the gain control signal output of said means for providing the gain control signal.
2. A low band converting circuit, comprising:

a burst gate pulse generator for generating a burst window pulse in response to reception of a horizontal synchronizing signal;

synthesizer means for generating a train of pulses having a given frequency, a pulse train delayed by a first phase and a pulse train delayed by a second phase, on the basis of said horizontal synchronizing signal;

a burst amplifier for generating a burst signal converted into low band, by amplifying the pulse train delayed by said second phase during a time period determined on the basis of the burst window pulse;

means for demodulating red-luminance signals and blue-luminance signals from color signals received;

first modulator means for modulating a demodulated blue-luminance signal from the demodulating means in low band on the basis of said train of pulses;

second modulator means for modulating a demodulated red-luminance signal from the demodulating means in low band on the basis of said pulse train delayed by said first phase; and mixer means for generating a low-band-modulated color signal by mixing the blue-luminance signal and the red-luminance signal modulated in low band in the first and second modulator means, with the burst signal modulated in low band from the burst amplifier.

3. The low band converting circuit of claim 2, further comprising:
means for generating a gain control signal on the basis of said red-luminance signals and blue-luminance signals from color signals received; and
means for controlling a color signal output from said mixer means to provide a controlled gain color output, on the basis of said gain control signal.

4. The low band converting circuit of claim 2, further comprising:
means for providing a switching control signal on the basis of said red-luminance signals and blue-luminance signals from color signals received; and
means for switching a color signal output between ON and OFF states in response to said switching control signal.

5. The low band converting circuit of claim 3, further comprising:
means for providing a switching control signal on the basis of said gain control signal; and
means for switching the controlled gain color output between ON and OFF states in response to said switching control signal.

6. A low band converting circuit, comprising:
a burst gate pulse generator for generating a burst window pulse by receiving a horizontal synchronizing signal;
synthesizer means for generating a train of pulses having a given frequency, a pulse train delayed by a first phase and a pulse train delayed by a second phase, on the basis of said horizontal synchronizing signal;
a burst amplifier for generating a burst signal converted into low band, by amplifying the pulse train delayed by said second phase during a time period determined on the basis of said burst window pulse;
means for demodulating a red-luminance signal and a blue-luminance signal from a color signal received;
means for modulating the demodulated blue-luminance signal from the demodulating means in low band on the basis of train of pulses and for modulating the demodulated red-luminance signal from the demodulating means in low band on the basis of said pulse train delayed by said first phase; and
mixer means for generating a low band-modulated color signal by mixing the blue luminance signals and the red-luminance signals modulated in low band in the first and second modulator means with the burst signal modulated in low band from the burst amplifier.

7. A low band converting circuit for use in a color signal recording system of a video tape recorder, comprising:
a burst gate pulse generator for generating a burst window pulse in response to a horizontal synchronizing signal;
a pulse synthesizer for generating a pulse train output having a given frequency in response to said horizontal synchronizing signal;
a first delay circuit for delaying the pulse train output of the pulse synthesizer by a first phase;
a second delay circuit for delaying the pulse train output of the pulse synthesizer by a second phase;
a burst amplifier for generating a burst signal converted into low band, by amplifying the delayed pulse train of the second delay circuit during a time period according to the burst window pulse supplied from the burst gate pulse generator;
a color signal demodulator for demodulating a Red-Luminance signal and a Blue-Luminance signal from color signals received;
a first modulator for receiving said Blue-Luminance signal from the color signal demodulator and the pulse train output of the pulse synthesizer to modulate said Blue-Luminance signal according to said pulse train;
a second modulator for receiving said Red-Luminance signal from the color signal demodulator and the delayed pulse train of the first delay circuit, for modulating said Red-Luminance signal in low band with the delayed pulse train of the first delay circuit;
a mixer for generating a low-band-modulated color signal by mixing the Blue-Luminance signal and the Red Luminance signal modulated in low band in the first and second modulators, with the burst signal modulated in low band of the burst amplifier;
a first detector for detecting the Blue-Luminance signal of the color-signal demodulator;
a second detector for detecting the Red-Luminance signal of the color-signal demodulator;
a color-gain controller for controlling automatically the color signal output from the mixer, to an output level on the basis of the detected Blue-Luminance and Red-Luminance signals of said first and second detectors; and
color killer switching means for switching between ON and OFF states the color signal output of the mixer in response to the detected Blue-Luminance and Red-Luminance signals of said first an second detectors.

8. A low band converting process for use in a color signal recording system of a video tape recorder, comprising:
generating a burst window pulse in response to a horizontal synchronizing signal;

generating a pulse train output having a given frequency in response to said horizontal synchronizing signal;

delaying the pulse train output by a first period to provide a first delayed pulse train;

delaying the pulse train output by a second period to provide a second delayed pulse train;

generating a burst signal converted into low band, by amplifying the second delayed pulse train during a time period according to the burst window pulse, so that said second delayed pulse train exhibits a given level;

demodulating a red-luminance signal and blue-luminance signal from color signals received to respectively provide a demodulated blue-luminance signal and a demodulated red-luminance signal;

receiving said demodulated blue-luminance signal and the pulse train output, and providing a first modulated luminance signal by modulating said demodulated blue-luminance signal in low band according to said pulse train output;

receiving said demodulated red-luminance signal and the first delayed pulse train, and providing a second modulated luminance signal by modulating said demodulated red-luminance signal in low band with the first delayed pulse train;

generating a low-band-modulated color signal by mixing the first modulated luminance signal and the second modulated luminance signal modulated in low band, with the burst signal converted into low band;

detecting the demodulated blue-luminance signal;

detecting the demodulated red-luminance signal;

controlling automatically the low-band color signal, to provide a controlled color signal having an output level, in response to a gain control signal;

amplifying the controlled color signal;

filtering the controlled color signal;

switching the controlled color signal between ON and OFF states in response to a switching control signal;

providing the gain control signal on the basis of the detection of said demodulated blue-luminance and said demodulated red-luminance signals; and providing the switching control signal to control the switching of said controlled color signal, according to the gain control signal.

* * * * *

UNITED STATES PATENT AND TRADEMARK OFFICE
CERTIFICATE OF CORRECTION

PATENT NO. : 5,142,378
DATED : August 25, 1992
INVENTOR(S) : Jong- Kyoung Yun

It is certified that error appears in the above-indentified patent and that said Letters Patent is hereby corrected as shown below:

IN THE ABSTRACT, [57]

Line 16    After "killer" change "suited" to ---switch---:

Signed and Sealed this

First Day of October, 1996

Attest:

BRUCE LEHMAN

Attesting Officer    Commissioner of Patents and Trademarks